United States Patent
Wilson, Jr.

(10) Patent No.: US 7,714,058 B2
(45) Date of Patent: May 11, 2010

(54) PAVEMENT LIFE EXTENSION PRODUCT AND METHOD

(75) Inventor: Jack H. Wilson, Jr., Madison, MS (US)

(73) Assignee: Tensar International Corporation, Atlanta, GA (US)

( * ) Notice: Subject to any disclaimer, the term of this patent is extended or adjusted under 35 U.S.C. 154(b) by 0 days.

(21) Appl. No.: 12/337,889

(22) Filed: Dec. 18, 2008

(65) Prior Publication Data

US 2010/0041795 A1   Feb. 18, 2010

Related U.S. Application Data

(60) Provisional application No. 61/089,719, filed on Aug. 18, 2008.

(51) Int. Cl.
- *C04B 7/02* (2006.01)
- *C04B 7/13* (2006.01)
- *C04B 24/00* (2006.01)
- *C04B 14/06* (2006.01)

(52) U.S. Cl. ............... 524/492; 524/2; 524/3; 524/4; 524/5; 524/8; 524/493; 524/494; 523/157; 523/172; 106/737; 106/816

(58) Field of Classification Search ........ 523/157, 523/172; 524/2, 3, 4, 5, 8, 492, 493, 494; 106/737, 816
See application file for complete search history.

(56) References Cited

U.S. PATENT DOCUMENTS

| | | | | |
|---|---|---|---|---|
| 3,449,880 A * | 6/1969 | Bailey, Jr. ............... 52/309.17 |
| 4,094,805 A | 6/1978 | Hansen |
| 4,237,152 A | 12/1980 | Loricchio et al. |
| 4,398,957 A * | 8/1983 | Ceska et al. ............... 524/5 |
| 4,421,797 A * | 12/1983 | Koehne .................. 427/403 |
| 4,430,463 A | 2/1984 | Mullenax |
| 4,492,781 A * | 1/1985 | Duszak et al. ............. 524/59 |
| 4,708,978 A * | 11/1987 | Rodgers .................... 524/5 |
| 4,714,507 A | 12/1987 | Ohgushi |
| 4,880,467 A | 11/1989 | Rirsch et al. |
| 5,244,304 A | 9/1993 | Weill et al. |
| 5,384,355 A * | 1/1995 | Allen ..................... 524/650 |
| 5,395,442 A * | 3/1995 | Dunton et al. ............. 106/724 |
| 5,494,741 A | 2/1996 | Fekete et al. |
| 5,947,635 A | 9/1999 | Wilson |
| 6,034,155 A * | 3/2000 | Espeland et al. ........... 523/220 |
| 6,517,915 B1 * | 2/2003 | Banus ..................... 428/15 |
| 6,624,232 B2 | 9/2003 | Wilson |
| 7,175,703 B2 | 2/2007 | Poole et al. |
| 2005/0092210 A1 * | 5/2005 | Radtke, Jr. ................ 106/706 |

OTHER PUBLICATIONS

UCAR Latex 413—Product Information Sheet.*

* cited by examiner

*Primary Examiner*—Milton I Cano
*Assistant Examiner*—Benjamin J Gillespie
(74) *Attorney, Agent, or Firm*—Berenato & White, LLC (57) ABSTRACT

The present invention defines and illustrates a method for extending the life of road, bridge, parking and aviation pavement. The material is combination of: A—a latex polymer emulsion; B—a dry blend to Type 1 Portland cement and specially sieved washed mason sand; C—a special non-skid aggregate; and water. This composite formula offers pavement resistance to destructive environmental conditions; enhanced pavement skid resistance, and provides a rapid service turn-around. The method is a combination of three variables: a) extensive surface preparation and repair techniques for different pavement types, b) high-capacity bulk mixing system and placement machine; and c) a blended polymer modified cement material composition for repair and resurfacing of a variety of transportation pavement types.

6 Claims, 7 Drawing Sheets

PAVEMENT LIFE EXTENSION PRODUCT AND METHOD

This application claims the benefit of U.S. Provisional application Ser. No. 61/089,719, filed Aug. 18, 2008.

BACKGROUND OF THE INVENTION

1. Field of the Invention

The invention relates generally to a pavement life extension method that combines a material, repair methods and equipment to accomplish the overall goal of extending the useful life of different types of transportation and vehicular pavement.

2. Background

In the case of other systems that use non-asphaltic combinations to overlay pavements, the material that is used requires far too much water which dilutes the latex emulsion beyond its limits thereby destroying the latex's binding and adhesive qualities. Another known product uses a cement/sand blend with too much cement. This product blends two parts 80 to 100 mesh mason sand with one part Type I Portland cement. This blend is far too rich in cement which in turn bleeds lime for an extended period of time and is also far too brittle (low plasticity) due to the large quantity of cement and not enough aggregate (sand). Other systems use equipment that is not proven in the marketplace or that is specifically designed for asphalt/petroleum based products. This renders a finished product that is aesthetically unacceptable and physically unstable.

Examples of Past Polymer Composition Pavement Overlays:

U.S. Pat. No. 5,244,304 Is directed to a paving composition including a cement binder, a dispersible latex polymer binder and a mineral aggregate filler such as sand.

U.S. Pat. No. 4,430,463 discloses a flexible acrylic polymer Portland cement coating composition having unusual shear bond (adhesive) characteristics and unusually high abrasion and heat resistance which incorporates sand, Portland cement, acrylic polymer, propylene glycol and a defoamer.

U.S. Pat. No. 4,714,507 sets forth a surface coating agent and method for applying the coating to a road surface. The surface coating agent comprises a principal ingredient consisting mostly of cement silicon dioxide, generally in the form of silica sand, iron oxide, zinc oxide, and glycine and a composite polymer emulsion composed mainly of carboxy-modified styrene-butadiene polymer, wherein the ratio of principal ingredient to the composite polymer is 2.0 to 6.0:1.

In addition, owing to the high cost of fossil fuels, a number of pavement maintenance products have become not only unsafe with respect to the environment, but have also become very expensive for many end users. Especially with respect to the usable life expectancy of these antiquated petroleum based materials, many end users, predominantly Federal, State and Aviation agencies, have been forced to investigate other products that would not only meet their budgetary constraints but also meet many other requirements centered around environmental issues, Solar Heat Reflectivity, comparable durability and rapid re-access to the assets with which the materials are placed. With regards to asphalt pavement; water, UV, hydrocarbons and extended spans between repaving or re-sealing has caused severe oxidation and raveling to many roads, bridges, aviation pavement/operating surfaces, parking lots and vehicular service areas to a point to where expensive reconstruction is the only option that for the foreseeable future is unaffordable. Once the sun begins to evaporate the fine oils that hold the binder together, the small aggregate and sand begin to loosen and gravitate to the road shoulder or curb. At that point all that is exposed is the ¼ to ½ inch polished rock and larger aggregate that decreases the coefficient of friction. This condition combined with wet weather and oils that naturally leak from passing vehicles can cause an extremely dangerous vehicular situation.

Coal Tar, a by-product of the coal industry, is a very well known and effective topical deterrent to asphalt oxidation, exposure to UV and water as well as fuel and chemicals. However, the negative aspects of its use has begun to outweigh its advantages. The product is considered to be very hazardous to human and animal exposure and animate and inanimate objects. Coal Tar sealers have a significant "tracking" effect that destroys interior flooring to buildings and businesses. Coal Tar also possesses a very strong odor that remains with the surface for weeks at a time. With regards to human exposure, applicators are exposed to caustic fumes that cause chemical skin burns and has also been believed to cause cancer in certain studies. Coal Tar has been banned from usage in a number of states due to PAH's, a chemical by-product of coal tar that is extremely harmful to humans, animals and the overall environment. Its continued use in a number of other states is based on the low cost of the material and its placement.

Another asphalt-based product that has seen a wide range of usefulness is a paving concept called Chip Seal or Chip Sealing. This pavement concept is widely used on county roads due to the low cost and low level of commercial traffic. The chip seal method is constructed of a heavy hot liquid asphalt tack material that is sprayed and sometimes spread with a slurry placement machine. The heavy hot asphalt tack material is then covered with limestone ranging in sizes from No. 88 (⅛") to No. 57 (1.5") and a blend of both and all between from a tandem dump truck and spread with a tractor or motor grader. The composition is then rolled with a 14 ton vibratory roller and allowed to cool and harden. Once hard and set, the road is then broomed several times with a commercial street sweeper to remove any loose aggregate. The main deficiency with this pavement maintenance technique is that within a very short time the aggregate begins to loosen and dislodge from the asphalt tack material. As vehicles ride over the surface more stones dislodge and are thrown up into oncoming or following vehicular traffic. This causes an exponential number of cracked and broken windshields and in many cases accidents caused by a build up or concentration of loose aggregate in the road center or edges. As most county roads are only 18 feet to 20 feet wide, there is very little margin for error once this condition evolves into reality. However, due to the growing concerns and hazardous events surrounding this concept, most counties have been forced to overlay this type of surface with a 1.5" asphalt overlay to rectify the liability chip seal roads create.

Concrete on the other hand, has predominantly been a very expensive alternative to asphaltic pavement construction. When crude oil prices were around $20.00 to $30.00 a barrel, asphalt remained the sub-base and surface of choice for public and private roads, parking lots and other transportation wearing surfaces. Concrete for the first time in its history has become less expensive than asphalt for the construction of many transportation related surfaces. Its durability, strength and resistance to UV, water, fuel and chemical spillage is incomparable to asphalt. However, full-depth concrete also suffers from a number of issues related to structural conditions, extreme chemical exposure and ride-ability. First of all, concrete is not as smooth a riding surface as asphalt. The construction process is very time consuming causing driver anxiety. Concrete tends to heave in a true plane in expansive soil regions causing vertical separations at each expansion joint. (Asphalt, on the other hand, tends to roll with the heaving soil and crack when its tensile strength is breached). This is a very dangerous traffic condition for both surfaces which requires planing of the uneven joint to smooth the transition from one panel to the next or the expensive process of panel replacement. Over an extended period of time the top ¼" "cream" of the concrete wearing surface begins to erode due to traffic, water and basic deterioration. At this point the aggregate becomes exposed which in turn substantially lowers the coefficient of friction for not only concrete roads but bridge decks. The transition from one type of pavement surface to a worn bridge deck surface can be extremely dangerous in wet weather. In severe cold weather conditions, depending on the aggregate used in the mix design, the aggregate can freeze in the top 1" of the concrete profile and cause the aggregate to burst due to the microscopic water polyps inside the concrete aggregate. This condition is referred to as "pop-outs" that can range from ½" to 2" in diameter which in turn can and will begin an erosion and concurrent spalling process. As for concrete bridge decks, there has historically been only one alternative for repairing many of the problems that plague old bridge decks . . . reconstruction. This reconstruction process is not only time consuming but also very expensive to State DOT (Dept. of Transportation), budgets. Many of the problems that are systemic with older concrete bridge decks are loss of friction due to exposure of the polished rock aggregate, concrete spalling and substantial aggregate pop-outs. These conditions are responsible for a large number of vehicular accidents in many states that suffer DOT budgetary problems because funds are not available for total reconstruction. Also, older bridge decks, especially those with wood/timber pilings, (characteristic of county roads), cannot withstand the additional weight load of full depth concrete overlays to repair and improve the ride-ability of these older bridge decks.

In an effort to resolve the weaknesses of these pavement materials and structural deficiencies, there have been a number of products that have been introduced to the market to try and minimize, slow down and ultimately stop the conditions and problems that these pavement commodities create with limited to moderate success. With this background synopsis it can be observed that there is a need for a highly evolved polymer modified cement micro overlay formulation, installation and repair method which overcomes the weaknesses of asphalt degradation, chip seal deterioration, coal tar sealer hazards and concrete road and bridge deck spalling, pop-out and joint repair. These evolutionary developments in addition to a rapid turn-around with minimal interruption to vehicular traffic are the essence of this invention.

SUMMARY OF THE INVENTION

The present invention advantageously fills the aforementioned deficiencies by providing a universal transportation pavement life extension product and method.

The present invention fills the proven need for a cost-effective, long-lasting, fuel/chemical-resistant, aesthetically pleasing, environmentally-safe and structurally-sound pavement coating system that can be applied to asphalt, concrete, chip-seal and old pavement sealers with state-of-the-art installation equipment and mixing techniques combined with new and improved preparation and pavement repair techniques. The following objects and characteristics explain in further detail the specific needs that are filled based on extensive research and development with the assistance of the US Army Corp. of Engineers, the FAA, and numerous State Dept. of Transportation Authorities. They are as follows.

It is an object of the invention to provide an alternative pavement micro-overlay composite material which fills oxidation and raveling voids in asphalt caused by environmental exposure and exposure to aliphatic hydrocarbons.

It is an object and characteristic of the invention to provide an enhanced coefficient of friction to oxidized asphalt roads, parking lots, concrete roads, concrete parking lots, aircraft operating surfaces and concrete bridge decks.

It is an object of this invention to provide a cost effective, durable and long lasting overlay product for deteriorating Chip Seal road surfaces. By encapsulating the oxidized chip seal surface with the polymer modified cement composite system, all stones are locked in place and a new, high strength, high friction structural composite road surface is created.

It is an object of the invention to provide a refined and efficient, high capacity mixing and application process for a smoother surface texture and shorter down time of the pavement work area.

It is an object and characteristic of the invention to provide a light colored finish which provides a cooler surface temperature than that of hot mix asphalt. By providing a lighter color of the finished product, the sub base asphalt material remains cooler and has a tendency to "pump" less.

It is a primary objective of this invention to provide detailed base preparation and repair techniques and materials applicable to the different pavement types and their respective common problems caused by the environment, vehicular traffic, unstable soil conditions and age.

It is an object and characteristic of this invention to provide a long lasting, highly durable, non-skid surface treatment to specifically older concrete bridge deck surfaces in order to minimize construction costs problems that include but are not limited to spalling, pop-outs and structural cracking and heaving.

The present invention is a combination of three (3) very important variables.

1) The Material: the material is a blend of a high solids acrylic/latex emulsion, a specially sieved cement/sand blend, water and a special quartz non-skid aggregate. When mixed together, this blend of raw components creates a "slurry" type mixture that when applied to asphalt, concrete and other pavement types and cured, possesses extremely high adhesive characteristics, chemical and fuel resistance, resistance to UV degradation, water, salts and deicing fluids and enhances the coefficient of friction lost from vehicular traffic and oxidation.

2) The Preparation and Repair Processes Pre-Overlay: This part of the invention is probably the most important. There are four (4) different types of transportation vehicular traffic surfaces to which this product and method can be applied: a) asphalt, b) concrete, c) chip seal and d) coal tar sealers. For each of these pavement types there are specific and detailed repair and preparation techniques required to, for the most part, prepare each surface to accept the polymer modified cement composition. If these techniques are not strictly followed, success of the entire invention is put at risk.

3) The Equipment: The equipment components are as follows: a) The high capacity ("HC") mixer: the HC mixer has been designed to take all the raw materials and mix in large quantities and blend the raw material to where no lumps, cement knots or dry pockets prevail from the blending of each ingredient. The mixer ranges in size from 1,000 gallons to 1,500 gallons depending on the size and daily production schedule of a project. It is a combination of a steel tank, gas powered hydraulic system and proprietary interior blade design. b) The Extrusion/Placer machine: The extrusion/ placer machine is self-propelled and designed to take between 300 and 350 gallons of the mixed polymer modified cement composition from the HC mixer and place the material on the project substrate with a specially designed extrusion blade that applies a layer between the thickness of 1/8" to 1/2" depending on the oxidation level of the pavement surface. The extrusion/placer machine can place up to 125,000 square feet per day. The extrusion/placer machine has a similar interior mixing blade design as the HC mixer in order to keep the polymer modified cement compound properly blended during placement.

The optional features are that of placement quantity and color of the polymer modified cement composition. The different size extrusion blades that are offered are a 6 foot, 8 foot, 10 foot and 12 foot wide design. The colors of the polymer modified cement composition that are offered are standard concrete gray and black. Specially sized mixing tanks can be built depending on the contractors specific requirements. The only difference is that of quantity (size). All other components of the HC mixer remain the same.

The present invention provides substantial advanced improvements over other similar coating/product designs, compositions, mixing and application procedures. This invention also includes comprehensive cleaning, sterilization and specific repair techniques applicable to the different pavement substrates specified within this application that are an integral part of this invention in order to provide the following:

Advance preparation and repair procedures for different pavement types

Enhanced coefficient of friction for all pavement types

Improved adhesion to asphalt, coal tar, asphalt rejuvenators and concrete

Comprehensive base preparation techniques prior to installation

An advanced concrete bridge deck repair and non-skid surfacing method

A new alternative to repairing "Chip Seal" road surfaces by structural encapsulation High capacity mixing and application Rapid turn-around for public and private facilities This invention offers something that no other known process provides: that is, the overall combination of multiple variables to provide the end user with a proven and complete system to repair and maintain transportation vehicular pavement with a state-of-the-art material, state-of-the-art equipment and proven preparation and repair methods Finally, it is an object of the present invention to provide a universal transportation pavement life extension method that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The following is a detailed and specific explanation and description of the invention, referred to commercially as the ENDURABLEND PMCO™ polymer composite micro overlay system. This description includes a technical documentation of all components of the pavement overlay material mixture, the equipment and specific, proven repair and preparation techniques/procedures that, when all are combined, create the overall long term durable pavement overlay of the invention. The method and product herein directly addresses the pavement life extension of asphalt, concrete and asphaltic based "chip seal" roads, bridges, parking lots and aircraft operating surfaces.

As an integral part of this invention, the surface preparation and repair of each type of specified pavement type is equal in importance and relevance to the later applied overlay material and method of application.

Asphalt Pavement Preparation and Repair Method Prior to Overlay:

For asphalt surfaces, the pavement must be degreased and/ or pressure washed with any effective degreasing agent, of which many are available and are not proprietary. The degreaser is applied to the asphalt pavement surface, scrubbed with an appropriate heavy duty broom, brush or street sweeper, then steam cleaned with a 3,500 PSI, 200° F. steam cleaner. If old traffic striping is present, the markings are removed with the same steam cleaner that is used with the degreasing of oil spots and fuel spills. If wheel rutting or cracks are present, a polymer modified cement material can be used to pre-fill these areas to within 1.5" of the original elevation. The repair material mixture of the polymer modified cement material is mixed with an additional additive of #12 angular granite chips. The steps of the repair process for rutting and sink holes, pre overlay, are as follows:

(i) The surface must be clean and dry (ii) A batch mixture applicable to the area to be repaired is blended in a 9 cubic foot mortar mixer with the following recipe: a) 1.5 gallons of Component A—latex emulsion, b) 75 lbs of Component B—dry cement powder blend, c) 15 lbs of Component C (1) #12 angular granite aggregate, ½ to ¾ of a gallon of water. All components are blended into a consistency that is void of all dry powder pockets and solids.

(iii) The composite blend is then placed in the hole or wheel rut and screeded with a magnesium strike-off or straight edge.

(iv) If the area that is full depth repaired is longer than 3 feet and wider than 1.5 feet, the placed polymer modified cement composition patch must be scored with a hand trowel or knife, full depth every 12 inches to prevent cracking and enhance curing.

(v) Once fully cured, (2 to 3 hours), a layer of a 12.5 mm×12.5 mm (½"×½"), open mesh, woven fiberglass, geotextile paving fabric is cut to the desired width and is applied with the adhesive side down onto the patch and rolled down (vehicle tire pressure is sufficient) to ensure adequate adhesion to the surface leveled with the polymer modified cement composition.

(vi) The final process of this pre-repair technique is to apply a smooth overlay of the patch with primary mixture of the polymer modified cement overlay material as specified above with a squeegee or modified rubber pull blade applicable to the width of the patch in order to encapsulate the completed repaired area with the geotextile fabric.

Method of Repairing and Preparing Severely Alligatored and Deteriorated Asphalt Prior to Overlay The asphalt specific pavement repair method described in this subsection addresses the repair and preventive maintenance of severely deteriorated and cracked asphalt pavement prior to an overlay using the primary system herein. However, due to the ever changing problems created by sub-standard, sub-base soil conditions; this method and material is not recommended for asphalt pavement that possesses and retains structural "pumping" conditions caused by expansive soils and clays found in a large part throughout the southeastern United States. As such, this asphalt pre-repair method and material addresses severe "alligator" cracking only on a relatively stable pavement base where water intrusion, hydrocarbons, UV degradation and basic lack of maintenance has caused the asphalt pavement to create semi-stable "islands" with a minimum size of 3" to 5" in diameter contained within medium to large areas of heavy vehicular traffic. These "islands" are separated from each other by cracks around the entire perimeter of the "island" ranging in width from ¼" to ¾" and have been found to be as deep as 1" up to 4" deep. The following method and material has been developed and tested in the field and is currently being installed on commercial heavy industrial vehicular pavement areas prior to the application of the primary ENDURABLEND PMCO™ polymer composite micro overlay system.

Alligatored Asphalt Preparation Method

When dealing with severe alligator cracking on asphalt, one must insure that the pavement area is not "pumping", (movement up and down caused by expansive soil clays that expand when wet and contract when dehydrated). This pavement condition can only be corrected through removal of the asphalt and sub base down to the certified depth for the region and replaced with fill material engineered and approved by the local geotechnical engineering authority. However, if the base is semi-stable, (no pumping), the pavement preparation consists of heavy cleaning through the use of a 3,500 PSI pressure washing machine to remove any and all granular, oily and vegetative contamination in and around the "island profile" of the deteriorated asphalt pavement area. In order for the described system to perform, all cracks surrounding the asphalt "islands" MUST be clean and open to insure a full depth penetration of the polymer composite mixture.

Mixing of the Polymer Composite First Layer, (Initial Repair Leveling Course).

This mix design for the alligatored initial overlay is different than the primary mix design herein in that the latex emulsion content is much higher than that of the standard polymer composite micro overlay systems eventually applied as the top wearing course overlay. This leveling course mix design, produced in a standard 9 cubic foot mortar mixer, (for ratio descriptive reasons only), is as follows:

Twenty (20) gallons, (176 LBS), of DOW 413 Latex Emulsion

480 LBS of Quickrete Cement dry blend, (1 part Type I Portland mortar to 3 parts 60 to 120 washed mason sand).

NO WATER

Composite mixture is thoroughly blended until composition texture is to a "loose-creamy" consistency.

Application of First Layer Leveling Course to Alligatored Asphalt:

This material is then poured onto the alligatored asphalt substrate and spread evenly with an applicable squeegee, (36" wide recommended), to adequately allow the material to fill all the crevices and cracks surrounding the "alligator cracking" surrounding the deteriorated asphalt islands. The consistency of this blend is such that it is "self-leveling" and fills all areas of cracking normally after the first pass of the squeegee. If another pass is required it is done while the existing layer is still wet and uncured. To enhance the adhesion of the second and final layer of the repair process, #4 quartz sand aggregate is manually spread while the leveling course is wet at a rate of no less that two (2) pounds per square yard.

Before the second layer can be applied, the primary leveling layer must cure from 3 to 5 hours. Once the material is cured enough to walk on, a second wearing course layer of the ENDURABLEND PMCO™ is applied with the applicable application equipment and standard mix design as set forth within the balance of this specification.

In an example of the above application: One (1) week of heavy vehicular traffic, exposure to hydrocarbons and rain; Temperatures for the week ranges from mid 80's to mid 40' each day and night (therefore thermal expansion was expected); No visible signs of any hairline cracking, efflorescence or decomposition appeared in any form.

Chip Seal Road Pavement Preparation and Repair Method:

For Chip Seal road surfaces, extraordinary care must be taken to remove any and all loose stones from the road bed surface. This can be accomplished by facilitating a heavy duty commercial street brooming machine making consecutive passes down each side of the road until all loose aggregate is removed (2 to 4 consecutive passes). Upon completion of the brooming, high pressure, compressed air is used to remove any dust or organic debris prior to spot repair using the polymer modified cement composition with the #12 granite aggregate. Any and all bare spots, holes and sparsely covered sections of the road bed are then repaired with the polymer modified cement composite material mixed with the #12 granite aggregate, as described above, and placed with a squeegee, magnesium straight edge or rubber squeegee pull blade in order to fill the voids prior to an overall resurfacing with the polymer modified cement composition overlay system as detailed herein.

Concrete Road and Bridge Deck Pavement Preparation and Repair:

Since concrete is a porous compound, care must be taken to remove all contamination from the micro subsurface of the top of the concrete pavement. This is accomplished by mixing a combination of 1 part phosphoric acid (75% concentration) with 5 parts water. The acid wash is then spread evenly over the entire concrete surface and immediately pressure washed with the 4,000 psi, 200° F. steam cleaner. This combination of chemicals, heat and water pressure has proven to be a more than adequate method for removing organic contamination deep within the pores of the concrete surface, concrete spalling, loose unbroken aggregate pop-outs and the acid/water residue. Note: Phosphoric acid is highly recommended due to its ability to break down and become inert immediately after its efflorescence and exposure to the concrete surface. The residue can then be washed off onto the road shoulder or over the bridge deck. The preferred concrete repair methods are herein described as follows:

I. Spalling (i) After cleaning and removal of any spalling discovered during the hydro blasting process, the pavement surface or bridge deck surface is then "chained" using a device developed to expose hollow areas within the top ½ to ¾ inch deep top layer of the concrete surface. The hollow areas are exposed by an audible hollow sound that is extremely accurate in determining the size and depth of the uncovered spalled areas to be excavated and repaired. The lower the pitch of the chain dragging over the concrete surface is positive evidence of concrete spalling from ¼" to ¾".

(ii) Once these areas are marked and removed (with light chipping hammers), the areas are cleaned with high pressure compressed air and filled with the polymer modified cement composition mixed with the #12 angular granite aggregate described above as in the Asphalt Pavement Preparation and Repair section portion of this specification.

(iii) Once the spalled areas are filled and have cured (3 to 5 hours), a second over layer of the polymer modified cement composition as referenced herein is placed over the primary patch to smooth out and level any rough or uneven profile of the surface texture.

II. Cracking (iv) If any cracks exist, they are cleaned out with the mentioned steam cleaning machine and then blown dry with high pressure compressed air. Depending on the width and depth of the cracks, several different products are applicable. However one specific concrete crack repair material has proven to exhibit extraordinary characteristics in regards to absorbing active crack energy and offering the polymer modified cement composition substantial bonding characteristics. This material, ULTRABOND 2100, manufactured by Sonneborn Chemicals is a two-component, self leveling, concrete epoxy that is applied by bulk caulk guns.

(v) The crack(s) to receive the Ultrabond 2100 treatment are filled to within 1 to 1.5 inches from the top elevation of the crack with an appropriately sized foam backer-rod.

(vi) The Ultrabond 2100 two-component, self-leveling epoxy is then placed into the crack(s) with high capacity, bulk caulk guns and allowed to cure for 30 to 45 minutes.

(vii) At the end of the curing time of the Ultrabond 2100 crack epoxy (30 to 45 minutes), a leveling layer of the polymer modified cement composition is then placed over the crack filled with the Ultrabond 2100 and allowed to cure for approximately 1 to 2 hours depending on the thickness and the porosity of the concrete bridge deck surface. The concrete surface is then ready for the polymer modified cement overlay material and method.

Wearing Course Polymer Composite Overlay Application:

The applied material composition and equipment detailed herein allows a ⅛" to ½" thick layer to be extruded onto semi-stable pavement surfaces (prepared as noted above) such as asphalt, chip seal and deteriorated concrete that when cured forms a durable membrane which adheres to the pavement surface, fills the voids caused by raveling and oxidation, and provides a non-skid wearing course all in one single pass with the self propelled secondary mixing and extrusion machine.

The formulation of the top wearing course overlay material, to be applied once the respective foregoing pavement specific preparation measures as noted above have been carried out, includes the following:

Component A—UCAR® Latex 413; Manufacturer: Dow Chemicals Company, Midland, Mich.

The following is a chemical analysis of the key ingredients of the DOW UCAR Latex 413 blended to the following specification:

| Component | CAS-No. | Concentration |
| --- | --- | --- |
| Polymer (BAIMMA) | 25852-37-3 | 54.1-58.6% by weight |
| Residual Monamers | Not required | |
| Aqua Ammonia | 1336-21-6 | ≦0.3% |
| Hydroxyethyl Cellulose QP-4400H | | 3% |
| Glycol Surfactant | | 25% |
| Water | 7732-18-5 | 19.6-21.5% |

The Hydroxyethyl Cellulose QP retards efflorescence in the set material, the Glycol Surfactant enables more pliability when the emulsion is mixed with a cementitious blend of Type I Portland Cement and aggregate, (sand blend). The actual percentage of solids in the latex itself—is preferably in the range of 54 to 58% by weight. Because of this, adhesion is the highest with respect to a variety of substrates and pliability is equally substantial. Once in place, reflective cracking, except for structural movement caused by expansive soil conditions, is minimal in a treated pavement. In placed examples, cracking has not returned within 60 days of placement and in-service use, despite highly expansive soil conditions with freeze thaw.

The foregoing latex emulsion is typically delivered in 55 gallon plastic drums, non pigmented and fully blended with all applicable ingredients for the process for which it is applied.

Component B—Cement Dry Blend, (1 part Type I Portland, 3 parts 60 to 120 mesh washed mason sand). Manufacturer: SpecMix STM, Harahan, La. The Cement dry blend, (aka, sand topping mix), is a standard blend powder formulated that is pre-blended at the manufacturing plant and delivered in 2,800 LB tote sacks. The finer mesh sieve sizes from 90 to 120 gives the material composition the ability to be feathered to a fine layer in circumstances surrounding placement along curbs, retaining walls and around drains and manholes.

Component C—Granusil #4 Quartz Aggregate; Manufacturer: UNIMIN Corporation Knoxville, Tenn. The Granusil #4 Quartz aggregate is delivered in 100 LB bags, 30 bags per pallet.

Each "kit" of the above mixture, (one mix of Component A, B and C), requires 100 LBS of the Component C non-skid aggregate. These durable mono-crystalline structures resist abrasion in high traffic/excessive wear applications and provide the stability formulators sought in high solids emulsions like the UCAR Latex 413, elastomerics, cemented and modified cementitious systems. Granusil is the preferred structural component in systems ranging from polymerized pavement overlays to artificial sports turf.

Figure 1:
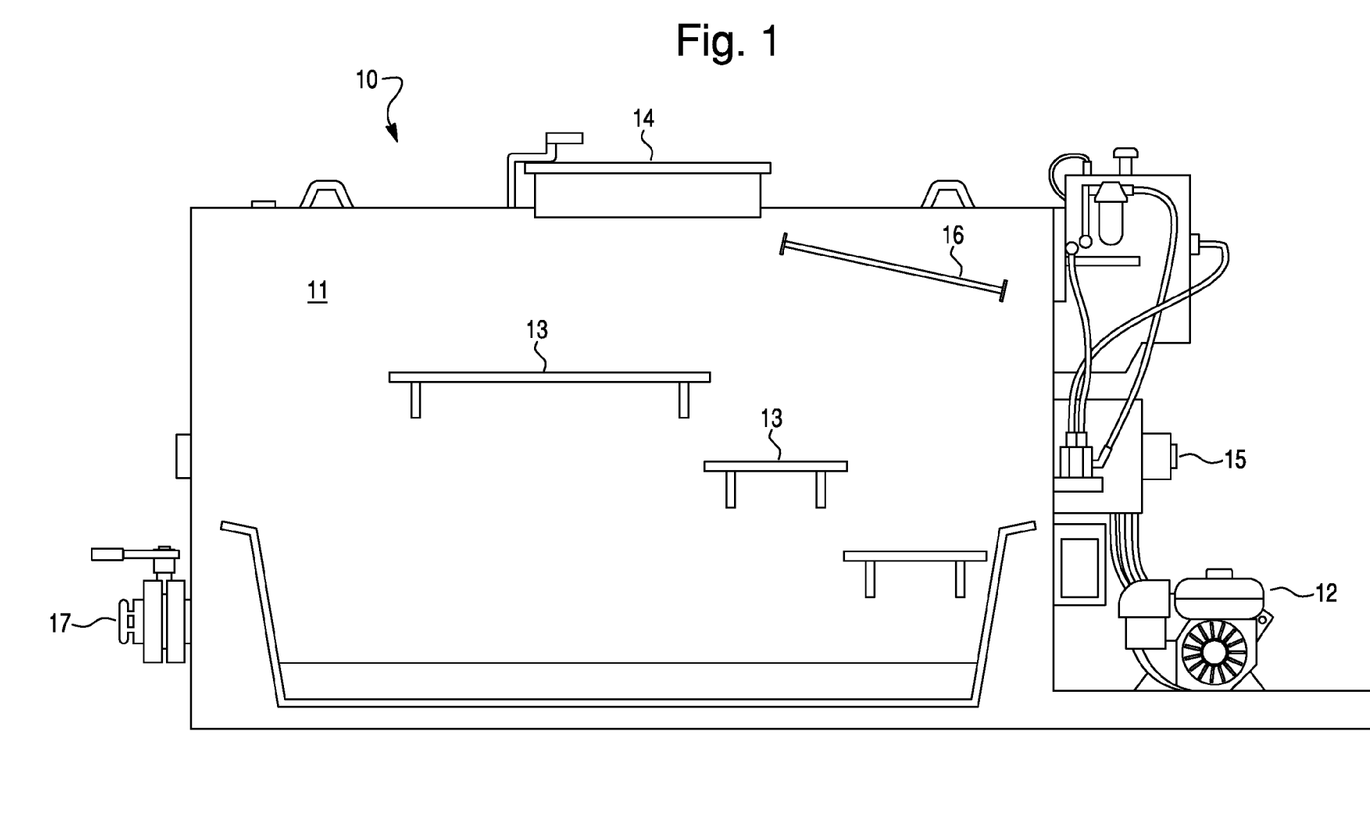
FIG. 1 is an elevation view of the High Capacity Bulk Mixing Machine.
Figure 9:
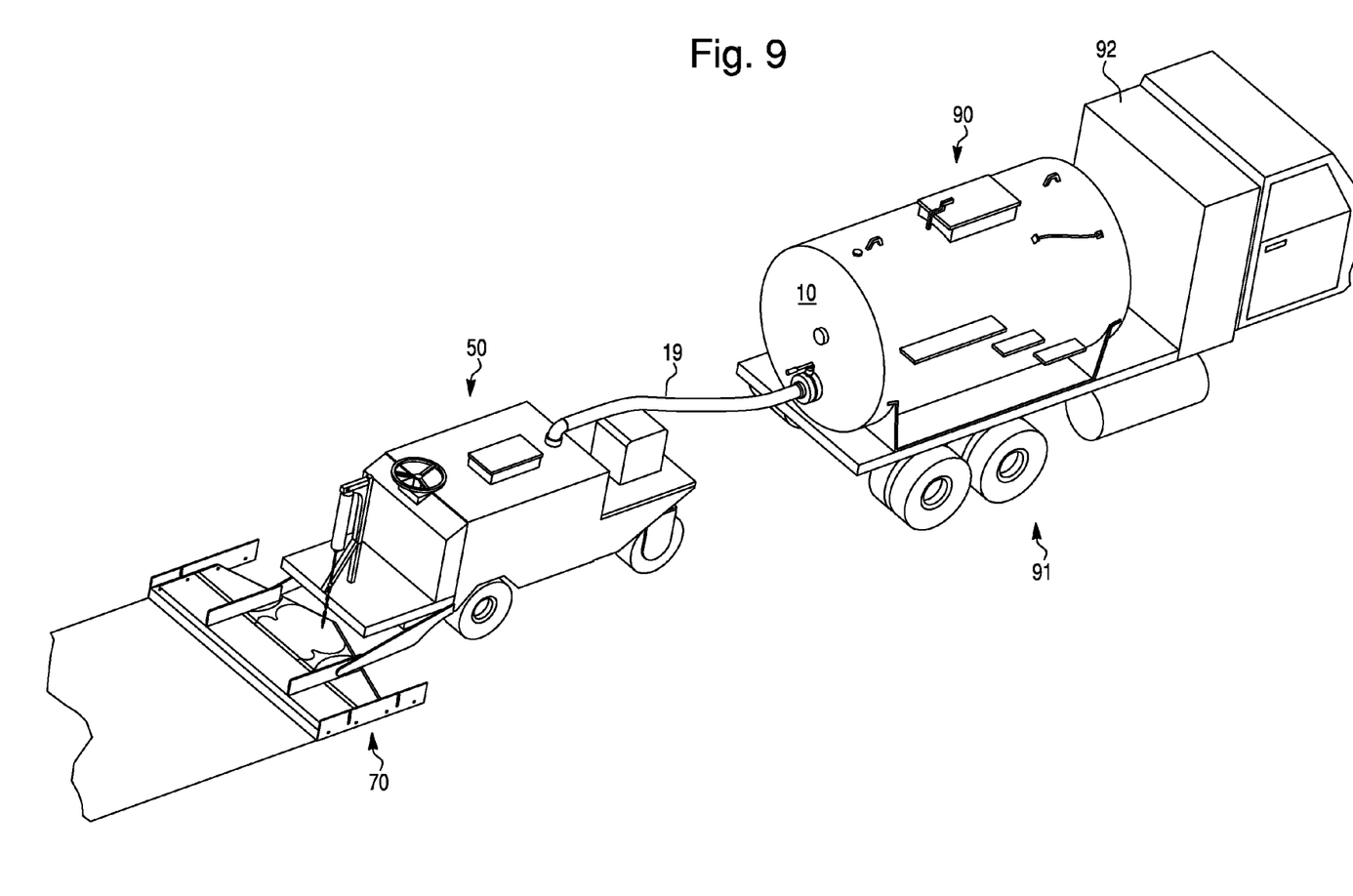
FIG. 9 shows a high capacity mixing machine charging, (filling), and the self propelled mixing and extrusion machine used in the present method.

On project locations, the latex provided in 55 gallon plastic drums is pumped into the 1,000 to 1,500 gallon, high capacity batch mixing machine 10 located on a 24' flatbed HD truck 91 with mobile crane 92 and/or an extended reach forklift. (A single batch kit as previously explained consists of 1-55 gallon drum of Component A—latex emulsion, 1-2,800 LB tote bag of Component B—cement dry blend and 1-100 LB bag of Component C #4 Quartz non-skid aggregate.) A normal job mix is 4 complete kits mixed simultaneously in the 1,500 gallon high capacity mixing machine 10 for approximately 20,000 square feet per full tanker load). Therefore, 4-55 gallon drums, (220 gallons), are pumped into the already agitating high capacity mixer 10. Once the latex emulsion is loaded, 25 gallons of potable water per kit (100 gallons per full job mix), is then pumped into the agitating mixer machine 10. The truck mounted crane then lifts each 2,800 LB tote bag of Component B over the screened man-hole opening 14 at the top of the mixer and gravity feeds the dry blend at a set rate which is determined by a relief valve at the bottom of each tote bag of cement dry blend. Once all four bags have been placed into the agitating mixer, the four 100 LB bags of Component C—#4 Quartz non-skid aggregate are placed in the mix by a technician at the top of the mixer machine. The composite blend is allowed to mix for 5 to 15 minutes prior to charging the self-propelled secondary mixer extrusion machine 50 for material placement.

FIG. 1 is a representation of the High Capacity Bulk Mixing Machine 10. The machine/tank 11 has a capacity of 1,000 to 1,500 gallons of mixed polymer modified cement composite material. The tank mixing system is powered by a Honda 18.5 HP gasoline engine 12 which operates a hydraulic hydrostatic drive system 15 controlled by a small joy-stick 16 approximately 38" up from the bottom "I" beam on the front of the machine. The joy-stick mount is attached to the tank itself which controls the direction and speed of the internal rotation of the mixing blade assembly 30. The tank 11 is further equipped with steps 13 and a hand rail 16 to allow technicians to observe mixing and mixture within the tank 11.

Figure 2:
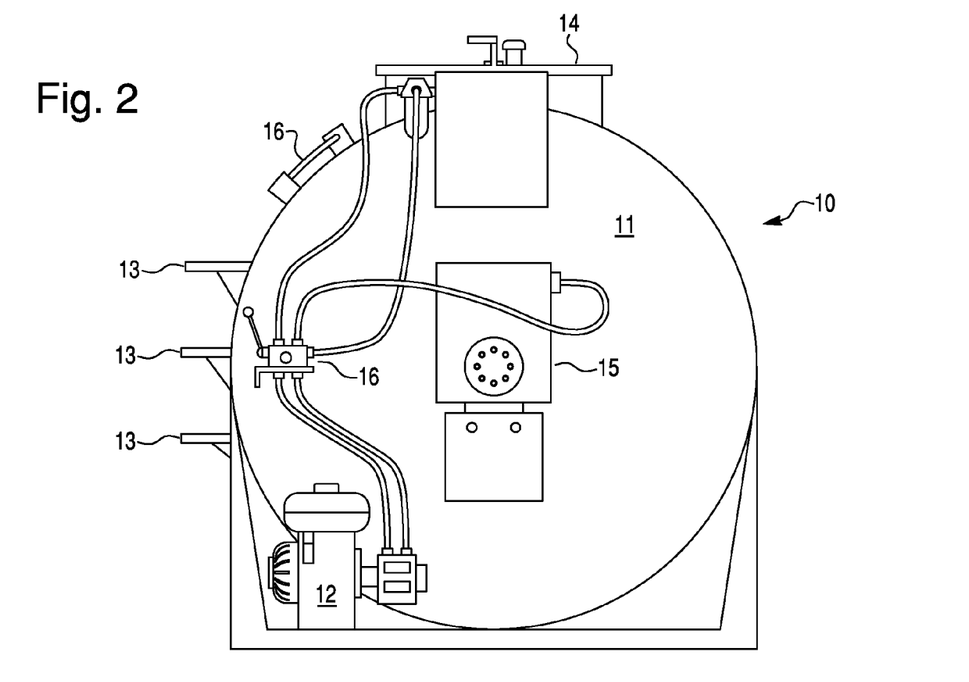
FIG. 2 is a view of the front view of the mixing machine shown in FIG. 1

FIG. 2 is a view of the front and rear of the mixing machine 10. The front of the machine holds the power plant 12 and hydraulic drive systems 15.

Figure 3:
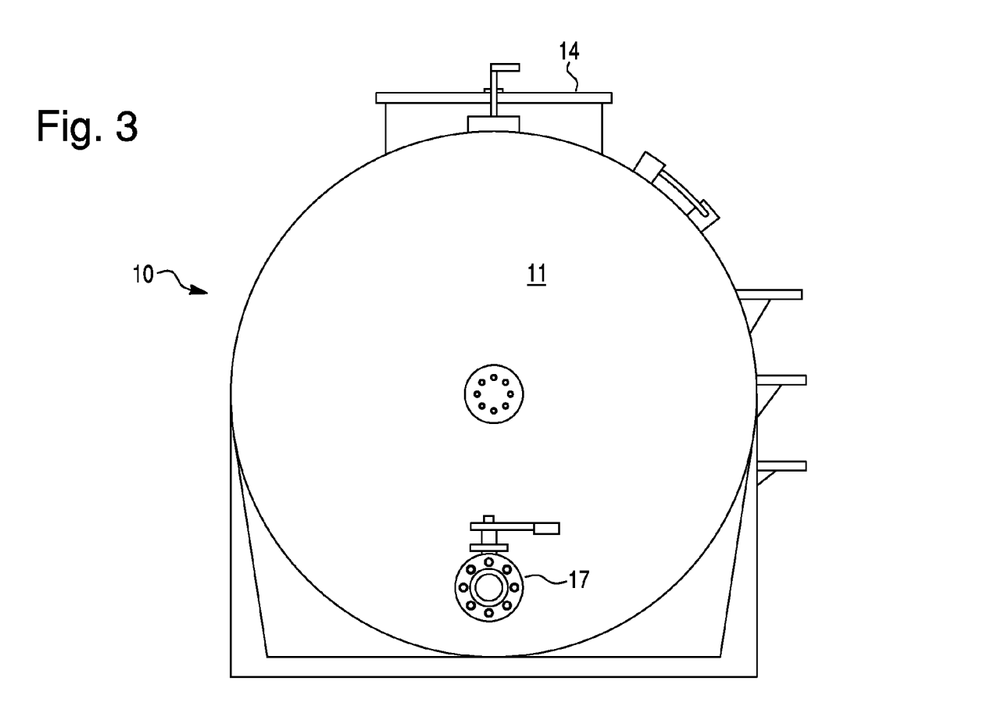
FIG. 3 is a rear view of the mixing machine shown in FIG. 1

FIG. 3 presents a view of the rear of the mixing machine 10. The rear of the tank 11 is the location of the 4" butterfly valve 17 that discharges the polymer modified cement composition material through a quick release, bulk cement hose 19 into the self-propelled extrusion machine 50 for placement.

Figure 4:
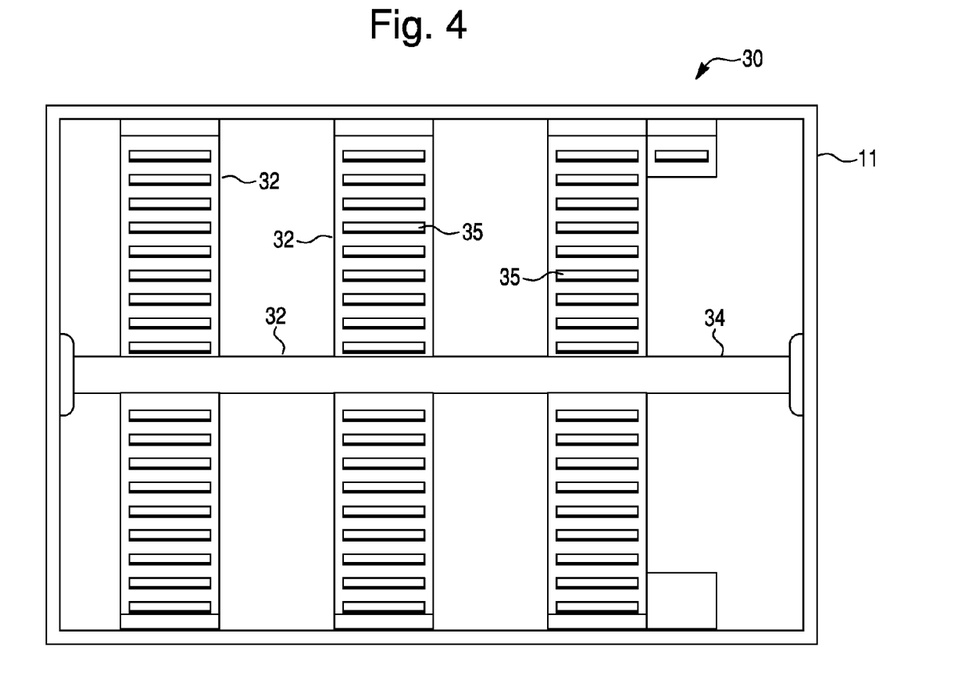
FIG. 4 is a partial view inside of the mixing tank of the mixing machine of FIG. 1 showing the internal mixing blade design.

FIG. 4 is a view of the inside of the mixing tank 11 to display the internal mixing blade design 30. There are 5 full length blades 32 (oriented at alternating 90 degree positions along shaft 34) welded to a 3" diameter solid steel shaft 34 that sweep the full diameter of the inside of the mixing tank 11 in order to remove any material from the inside skin of the steel tank 11. Each full length blade 32 has 24¼" steel blade plates 35 that measure 3" wide by 18" long and are welded on both ends and sides to the 3" angle iron full length blades 32. All ¼" steel plates 35 are set at a 45° angle for a maximum attack against the polymer modified cement blend as the different raw materials are placed into the mixing chamber.

Figure 5:
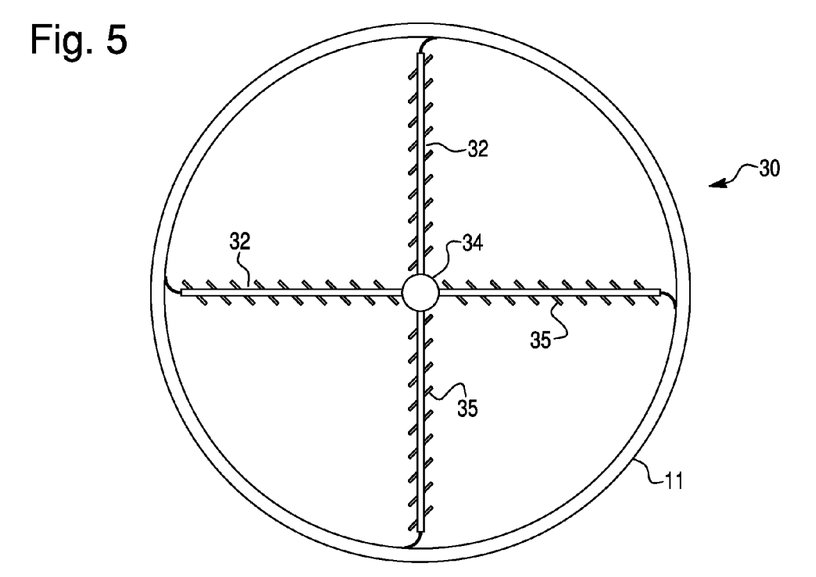
FIG. 5 is a partial end view section showing the mixing blade of FIG. 4.

FIG. 5 shows an end view of the 90 degree oriented mixing blades 32.

Figure 6:
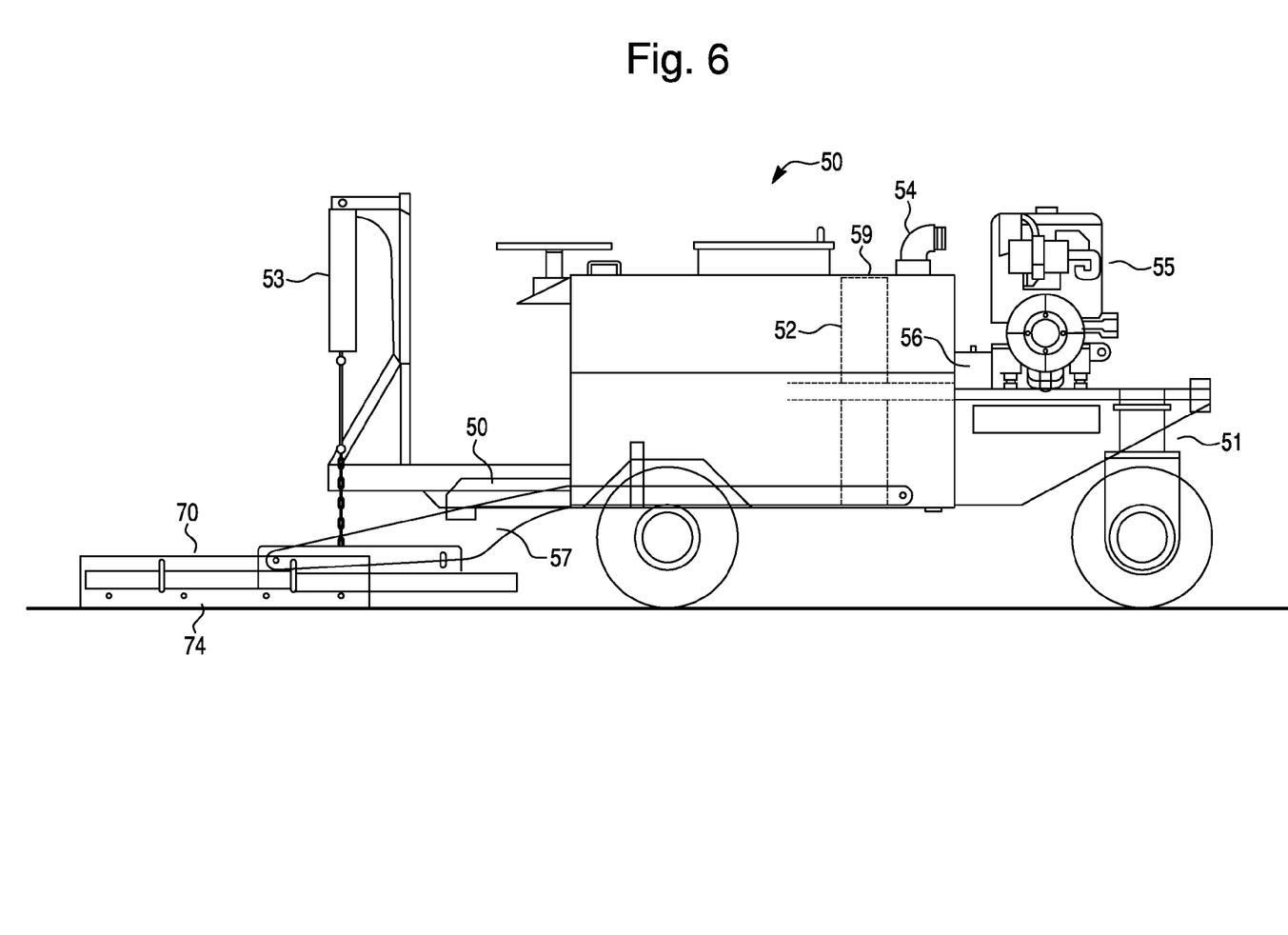
FIG. 6 is a schematic side view rendering of a self propelled, extrusion machine used in the present method.

FIG. 6 is a schematic rendering of the self propelled, extrusion machine 50. This machine is designed to accept a 350 gallon load of polymer modified cement composite material into mixing tank 52 through the 4", 90°, quick release coupling 54 at the top of the machine behind the engine and hydraulic system. This machine is propelled by a Kubota 35 HP diesel engine 55 and hydrostatic drive system 56 which operate all controls. The controls are as follows: a) the hydrostatic drive system 56, b) the lifting actuator cylinder 53 that raises and lowers the toe arms 57 that hold the extrusion blade 70 at a specified elevation from the pavement surface, c) the release valve 58 that allows the polymer modified cement composite material to flow into the initial extrusion chamber, d) the steering 51 and internal rotation of the mixing blades 59 (shown as dotted inside tank 52).

Figure 7:
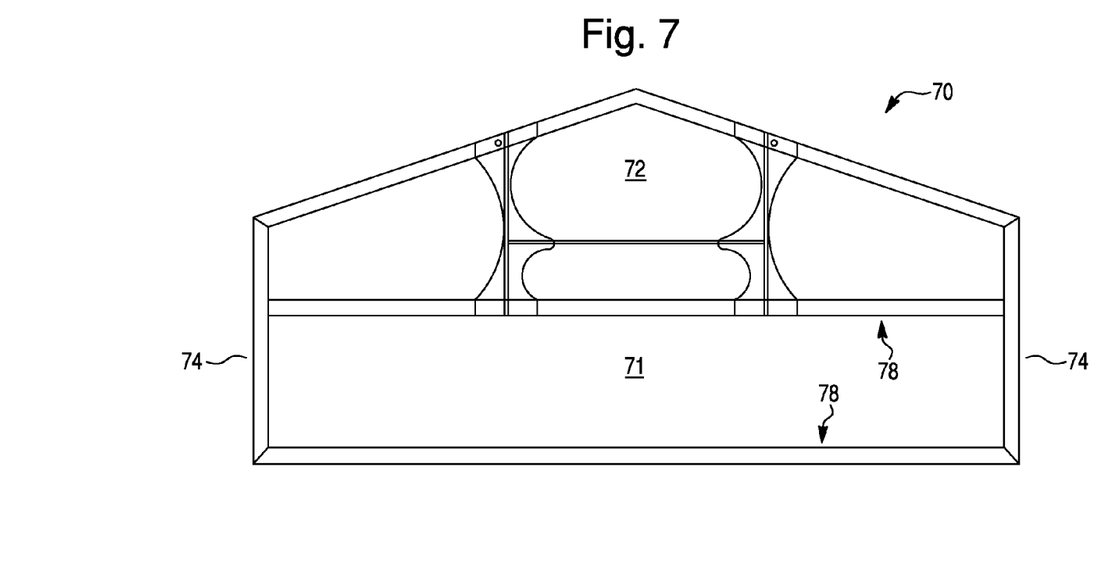
FIG. 7 is a schematic plan view drawing of the 12' extrusion blade mounted behind the machine shown in FIG. 6.

FIG. 7 is the schematic drawing of the 12' extrusion blade 70. The blades come in 16', 12', 10' and 8' pre-fabricated single unit designs. The initial chamber 72, (the top section in the diagram), is the section of the extrusion blade that spreads the polymer modified cement composition across the full width of the blade 70 to the end blades 74 on each end. The end blades 74, (at the lower right of the diagram) are designed to preset the adjustable height of the blade system in order to compensate for pavement surfaces that require a thick wearing surface or a surface that requires grooving for hydromigration. The back chamber 71 of the blade is designed to allow any out-gassing of air that was trapped in deep pockets within the pavement profile that were created by abnormal or heavy oxidation and raveling. Due to the recommended pace of the extrusion machine 50, (0.75 meters per minute), air trapped by the primary chamber 72 is allowed to escape and the second chamber 71 fills the voids caused by the bubbles and then provides the smooth surface texture designed and described within this invention method. The extrusion blade 70 is constructed overall of ¼" steel angle iron, $\frac{1}{16}^{th}$" plate steel, 60 durometer neoprene rubber (for squeegees 78) and 2 in. wide squeegee brushes 79 for the end blade assemblies 74.

Figures 8A, 8B:
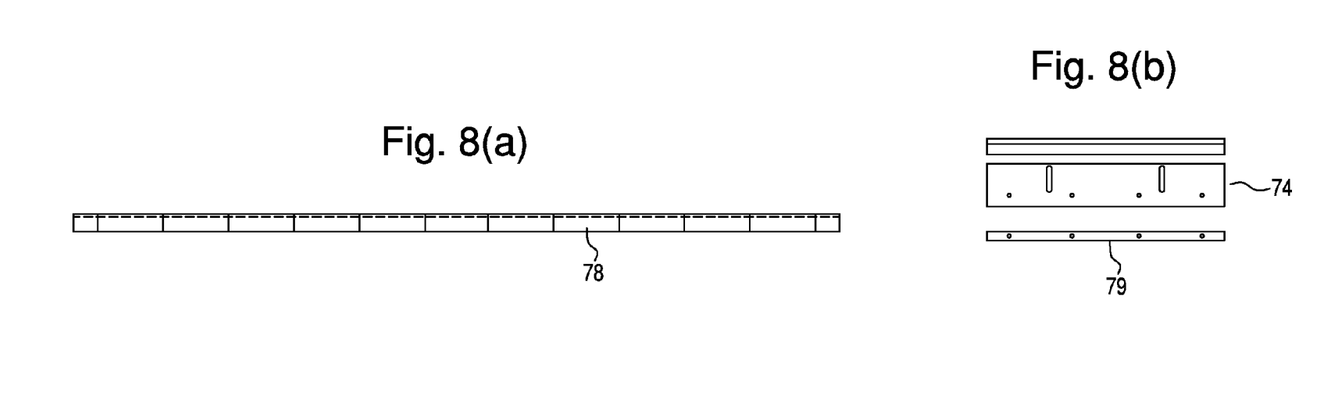
FIGS. 8(a) and 8(b) are schematic representations of a rubber squeegee attached to the angle iron elements, of the extrusion blade assembly in FIG. 7, on the mid, end plate, and side plate angle iron elements thereof.

FIG. 8 is a schematic representation of how the rubber squeegee 78 is attached underneath to the angle iron extrusion blade assembly thus creating two spreading chambers 72 and 71 that apply and re-apply the polymer modified cement composite material from the respective chambers of the extrusion blade 70 to the surface beneath.

FIG. 9 displays the high capacity mixing machine 10 charging, (filling), and the self propelled mixing and extrusion machine 50. The method is designed to make systemic and consecutive passes at minimum 12' widths, overlapping each prior placed pass by not more than about 4".

Figure 10:
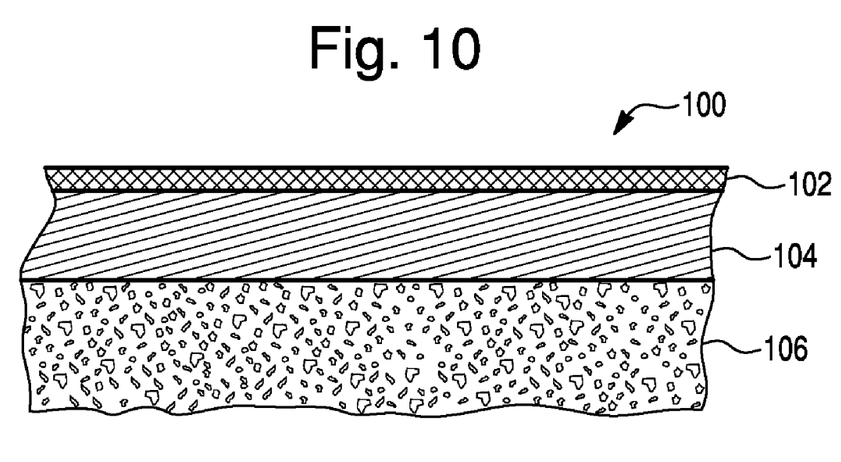
FIG. 10 is a partial sectional view of the polymer modified cement composition of the present invention placed over an asphalt or concrete substrate.

FIG. 10 is a partial side sectional illustration 100 of the polymer modified cement composition 102 placed and finished over the asphalt or concrete substrate 104. In section: (i) The ⅛" to ½" polymer modified cement composite overlay material 102; (ii) The asphalt or concrete substrate 104; (iii) The compacted, granulated sub-base material 106.

In summary, the invention is an overall environmentally safe Pavement Life Extension Method™ to repair and protect different compositions of transportation related pavement from the harmful effects of oxidation, raveling, and structural foundation problems caused by water, UV, exposure to aliphatic hydrocarbons, (fuels, hydraulic fluids and other chemicals), subsurface soil conditions and age. The invention is also designed to provide a long lasting, high coefficient of friction to these different pavement compositions with minimal downtime for construction and vehicular interruption and a cost-effective value proposition for municipal, government and private industry budgets. It is also very important to understand that all three variables, (material, preparation and repair, mixing and application equipment), are all crucial to the overall success i.e., long term durability and cost effectiveness, of the invention within the marketplace for which it is placed.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims It is indeed intended that the scope of the invention should be determined by proper interpretation and construction of the appended claims and their legal equivalents, as understood by those of skill in the art relying upon the disclosure in this specification and the attached drawings.

The invention claimed is:

1. A polymer modified Portland cement pavement overlay product for application on all pavement surfaces, comprising in combination:
   component A: latex/polymer emulsion, having a polymer solids content of 54.1 to 58.6 percent by weight;
   component B, a dry powder blend of Type I Portland cement (1 part) and a sand (3 parts) blend of 60-120 mesh washed silica sand;
   component C, a #4 sized quartz non-skid aggregate; and, water,
   the foregoing Components A, B, and C mixed such that a proportion of Component A is provided in a range of about 55 gallons for every 2800 lbs of Component B and is mixed with 100 lbs of Component C along with 20-25 gallons of said water until free of powder pockets and air voids, said #4 aggregate being held in suspension in said product, and said product applied to overlay said pavement surface at a thickness of ⅛ to ½ inches.

2. An overlay product as in claim 1, wherein:
   said component A latex/polymer emulsion, has a polymer solids content of about 58 percent by weight.

3. An overlay product as in claim 1, wherein:
   said product is extruded onto said pavement surface.

4. A kit for preparing a polymer modified Portland cement pavement overlay product for application on all pavement surfaces, said kit comprising in combination:
   55 gallons of component A: latex/polymer emulsion, having a polymer solids content of 54.1 to 58.6 percent by weight;
   2800 lbs of component B, a dry powder blend of Type I Portland cement (1 part) and a sand (3 parts) blend of 60-120 mesh washed silica sand;
   100 lbs of component C, a #4 sized quartz non-skid aggregate; and,
   the foregoing kit Components A, B, and C are mixed along with about 20-25 gallons of water until free of powder pockets and air voids, said #4 aggregate being held in suspension in said product, and said product applied to overlay said pavement surface at a thickness of about ⅛ to ½ inches.

5. A kit as in claim 4, wherein:
   said component A latex/polymer emulsion, has a polymer solids content of about 58 percent by weight.

6. A kit as in claim 4, wherein:
   said product created from said kit is extruded onto said pavement surface.

* * * * *